UNITED STATES PATENT OFFICE.

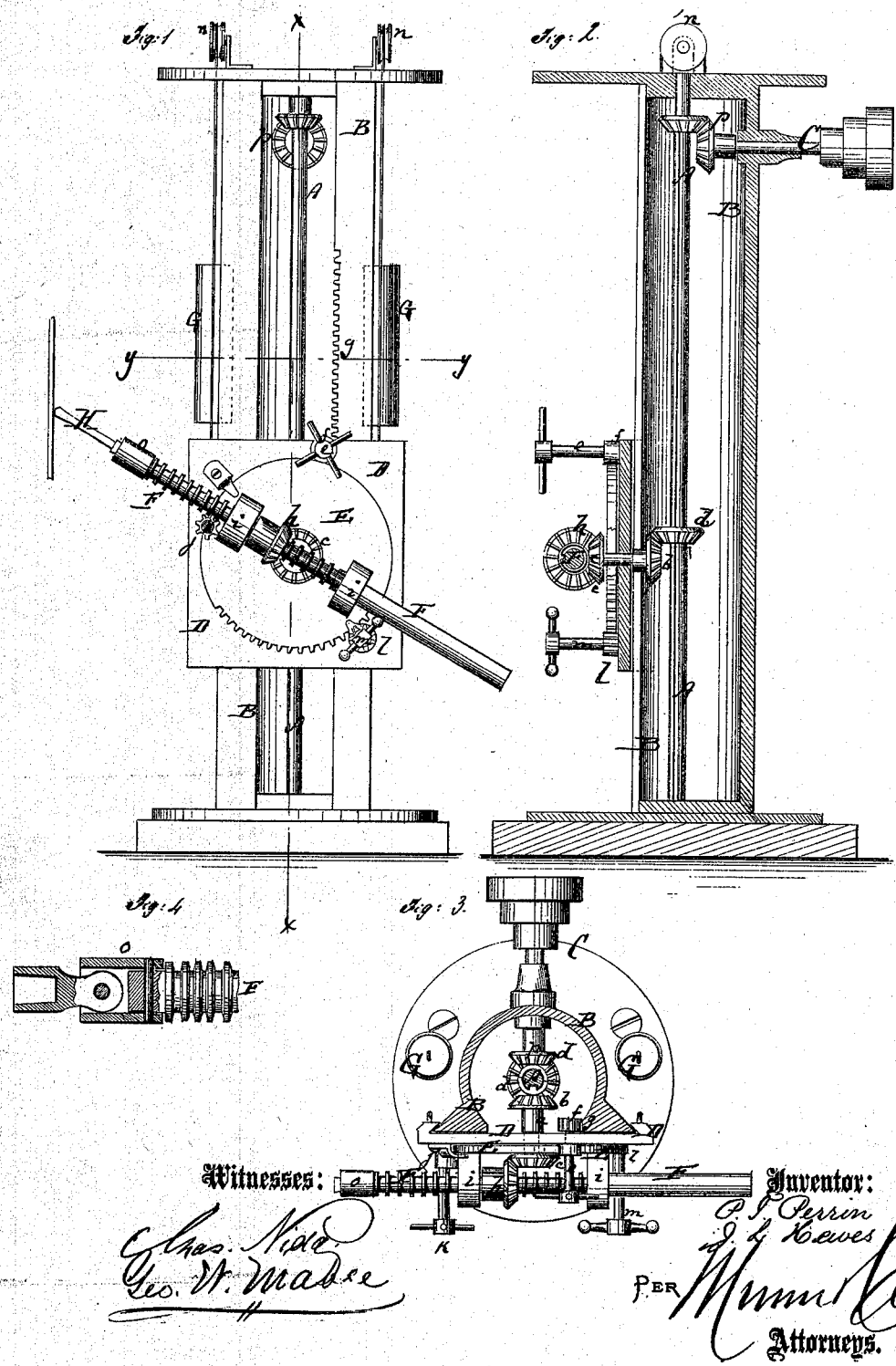

PARLEY I. PERRIN, OF TAUNTON, MASSACHUSETTS, AND JOSEPH L. HEWES, OF NEWARK, NEW JERSEY, ASSIGNORS TO PARLEY I. PERRIN.

IMPROVEMENT IN MACHINES FOR TAPPING BOILERS.

Specification forming part of Letters Patent No. 112,626, dated March 14, 1871.

*To all whom it may concern:*

Be it known that we, PARLEY I. PERRIN, of Taunton, in the county of Bristol and State of Massachusetts, and JOSEPH L. HEWES, of Newark, in the county of Essex and State of New Jersey, have invented a new and Improved Machine for Tapping Boilers, &c.; and we do hereby declare that the following is a full, clear, and exact description thereof, which will enable others skilled in the art to make and use the same, reference being had to the accompanying drawing, forming part of this specification.

Figure 1 represents a side elevation of our improved machine for tapping boilers, &c. Fig. 2 is a vertical transverse section of the same, $x\ x$, Fig. 1, being the section-line. Fig. 3 is a horizontal section of the same, $y\ y$, Fig. 1, being the section-line. Fig. 4 is a detail enlarged section of the universal joint at the end of the adjustable spindle.

Similar letters of reference indicate corresponding parts.

Our invention relates to the drill-spindles of machines for tapping boilers or doing analogous work; and consists in constructing and connecting the same to its boring-tool, so as to allow a slight lateral play to the tool.

The invention is more particularly intended for use on locomotive and other steam-boilers, but may be used with equal advantage on other articles or apparatus.

The rotary spindle is vertically and longitudinally adjustable, and is hung in a swivel-disk for receiving direction. It has a joint near its outer end to yield to slight differences in the position of drill and spindle.

A in the drawing represents a vertical shaft, hung in a frame, B, of suitable shape, and connected by gearing $p$ or otherwise with a suitable driving-shaft, C. D is a sliding plate, arranged to work up and down along one face of the frame B. It carries at its face a swivel-disk, E, in which is hung a central arbor, $a$, carrying bevel-gear wheels $b\ c$ at its ends, as in Fig. 2. The inner wheel, $b$, meshes into the teeth of a pinion, $d$, which is vertically adjustable on the shaft A, being by a groove and feather connected with, to be revolved by, the same.

The plate D carries an arbor, $e$, with a pinion, $f$, meshing into a toothed rack, $g$, formed stationary on the frame B. By turning the arbor $e$ the plate D will be adjusted up or down at will on the frame B, but will, during the adjustment, always retain the arbor $a$ in gear with the shaft A, as the pinion $d$ will slide up and down to constantly remain in gear with $b$.

The outer pinion, $c$, of the arbor $a$ meshes into a pinion, $h$, that fits loose over a spindle, F, whose bearings are in ears $i\ i$, projecting from the disk E. The pinion $h$ is so fitted upon the spindle F that it will be revolved together with the same, but allow longitudinal adjustment of said spindle.

A pinion, $j$, on an arbor, $k$, that is hung to the disk E, meshes into the toothed or grooved spindle F, and serves to adjust the same longitudinally.

A pinion, $l$, on an arbor that is hung to the frame B, meshes into the toothed edge of the disk E, and serves to revolve the same, so as to set the spindle to any suitable inclined position.

The plate D, with all its appendages, is balanced by weights G G, passing over friction-rollers $n\ n$, as shown.

It will be seen that in every position of the plate, disk, or spindle the latter is in constant gear with the shaft A, and therefore always revolved. By the arbor $k$ the spindle is gradually fed ahead to force the boring or other tool forward, or it is drawn back from the plate or article against which it was working. By the arbor $m$ the spindle is adjusted to an inclined horizontal or vertical position, and by the arbor $e$ it will be set to the requisite height.

The front end of the spindle is fitted in form of a sleeve, $o$, upon the body thereof, and has a slight play, as on a limited universal joint.

The boring or other tool H fitted into said sleeve can thus slightly vary from the direction of the spindle without straining any of the parts.

Having thus described our invention, we claim as new and desire to secure by Letters Patent—

The spindle F and tool H, combined, as described, with an intermediate sleeve, o, having a slight lateral play upon said spindle, for the purpose of enabling the tool to get out of line with the latter without being strained thereby.

PARLEY I. PERRIN.
JOSEPH L. HEWES.

Witnesses for Perrin:
E. D. GODFREY,
H. F. BASSETT.

Witnesses for Hewes:
GEO. W. WILLIAMS,
J. R. WILLIAMS.